(12) United States Patent
Honda

(10) Patent No.: US 7,905,513 B2
(45) Date of Patent: Mar. 15, 2011

(54) SIDE IMPACT AIRBAG APPARATUS

(75) Inventor: Kensaku Honda, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 154 days.

(21) Appl. No.: 12/320,607

(22) Filed: Jan. 30, 2009

(65) Prior Publication Data

US 2009/0206585 A1 Aug. 20, 2009

(30) Foreign Application Priority Data

Feb. 18, 2008 (JP) ................................. 2008-036323

(51) Int. Cl.
*B60R 21/207* (2006.01)
*B60R 21/237* (2006.01)

(52) U.S. Cl. ................... 280/730.2; 280/729; 280/743.1
(58) Field of Classification Search .................. 280/729, 280/730.2, 743.1; 493/243, 244
See application file for complete search history.

(56) References Cited

U.S. PATENT DOCUMENTS

| | | | | |
|---|---|---|---|---|
| 5,224,732 A * | 7/1993 | Warner et al. | ............... | 280/730.2 |
| 5,570,900 A * | 11/1996 | Brown | ............................ | 280/729 |
| 5,667,243 A * | 9/1997 | Fisher et al. | ................ | 280/730.2 |
| 5,687,987 A * | 11/1997 | Spencer et al. | .............. | 280/728.2 |
| 5,765,863 A * | 6/1998 | Storey et al. | ................... | 280/729 |
| 5,899,490 A * | 5/1999 | Wipasuramonton et al. | ............................... | 280/730.2 |
| 6,196,577 B1 * | 3/2001 | Aoki et al. | ................. | 280/730.1 |
| 6,224,092 B1 * | 5/2001 | Sakamoto et al. | .......... | 280/730.2 |
| 6,231,070 B1 * | 5/2001 | Sunabashiri et al. | ....... | 280/730.2 |
| 6,997,473 B2 * | 2/2006 | Tanase et al. | ............... | 280/730.2 |
| 7,156,418 B2 * | 1/2007 | Sato et al. | .................... | 280/730.2 |
| 7,549,672 B2 * | 6/2009 | Sato et al. | ................... | 280/730.2 |
| 7,594,677 B2 * | 9/2009 | Sendelbach et al. | ........ | 280/743.1 |
| 2008/0079249 A1 * | 4/2008 | Yamamura | .................. | 280/730.2 |
| 2008/0238057 A1 * | 10/2008 | Inoue et al. | .................... | 280/735 |

FOREIGN PATENT DOCUMENTS

WO       WO 2004/050434       6/2004

* cited by examiner

*Primary Examiner* — Paul N Dickson
*Assistant Examiner* — Laura Freedman
(74) *Attorney, Agent, or Firm* — Posz Law Group, PLC

(57) ABSTRACT

A side impact airbag apparatus includes an inflator 41 that discharges inflation gas, an airbag 20 that incorporates the inflator in a rear portion and is folded to form a storage state, and a storage portion located in the vicinity of an outer side of an occupant seated on a vehicle seat. The storage portion stores the inflator 41 and the airbag 20 when in the storage state. Inflation gas discharged from the inflator 41 in response to a side collision inflates and deploys the airbag 20 into a space between a body side portion of the vehicle and the vehicle seat while unfolding the airbag 20. A front portion of the airbag 20 in a deployed state that is forward of the inflator 41 is folded from the front toward the rear, so that the airbag 20 is made into a transitional form elongated in an up-down direction. A lower portion 37 of the airbag 20 in the transitional form below the inflator 41 is folded in a bellows-like manner from the bottom toward the top such that folded sections 37A are perpendicular to the up-down direction. Accordingly, the airbag 20 is made into a storage state.

7 Claims, 8 Drawing Sheets

Rear ←   → Front

SIDE IMPACT AIRBAG APPARATUS

BACKGROUND OF THE INVENTION

The present invention relates to a side impact airbag apparatus that is mounted on a vehicle to reduce impact applied to a side of the vehicle.

Side impact airbag apparatuses are known as devices that protect an occupant of a vehicle from impact due to a side collision with a side portion of the vehicle body such as a side door. Such an apparatus includes an inflator that discharges inflation gas in response to a vehicle side collision and an airbag that is inflated and deployed by the inflation gas supplied by the inflator. The inflator is incorporated in the airbag. The airbag and the inflator are stored in a portion of a vehicle seat that is close to an outer side of an occupant seated on the seat, for example, in an storage portion provided in a seat back (backrest portion).

In the above mentioned side airbag apparatus, when the body side portion receives an impact from the outside due to a side collision, the inflator discharges inflation gas into the airbag. The supplied inflation gas causes the airbag to shoot out from the seat back and pass through a narrow space between the occupant seated on the vehicle seat and the vehicle body side portion. The airbag is inflated and deployed into a size and shape capable of protecting the occupant. This type of airbag reduces the impact that is transmitted from the outside to the occupant through the body side portion.

The airbag and the inflator of the above described side impact airbag apparatus need to be stored in the storage portion in the seat back of a limited size. Therefore, when stored in the storage portion, the airbag is required to be in a compact form (form suitable for storage).

To meet such a need, an airbag in a deployed state is normally folded in the following manner before being stored in the storage portion. First, a portion of the deployed airbag that is forward of the inflator is folded from the front toward the rear, so that the airbag is folded into a transitional form elongated in the up-down direction. Next, a portion of the airbag in the transitional form that is below the inflator is folded forward, and the folded part is further folded from the front toward the rear. Through this folding process, the airbag becomes compact in the up-down direction as well as in the front-rear direction. For example, Japanese National Phase Laid-Open Patent Publication No. 2006-508846 discloses a folding process in which a portion of an airbag that is located below an inflator is folded from the front toward the rear as in the above described airbag.

When an inflator supplies inflation gas to an airbag that has been folded into the storage state described above and stored in an storage portion of a seat back, the airbag is first inflated and deployed forward while being unfolded, and then is inflated and deployed downward.

However, when the airbag is inflated and deployed downward after being inflated and deployed forward, the airbag cannot easily enter the narrow space between the body side portion and the lumbar region and a thigh of the occupant. The reasons for this are considered to be as follows. That is, when the airbag is about to enter the narrow space after inflated and deployed forward and then downward, the airbag may press the occupant downward against the seat cushion. If the occupant is pressed against the seat cushion, it is difficult to move the occupant inward with respect to the widthwise direction of the vehicle and to enlarge the space between the occupant and the body side portion. This hampers the airbag from entering the space between the occupant and the body side. Therefore, the airbag can hardly be deployed to reach a lower position between the occupant and the body side portion and reliably protect the occupant.

If an airbag is folded in such manner that the airbag is only folded from the front toward the rear so that the airbag has a thin shape extending in the up-down direction, the above described problem is largely avoided. This is because the airbag in the storage state is deployed to a low position from the beginning. However, in this case, the airbag has an elongated shape in the up-down direction. This complicates the process for storing the airbag in the storage portion of the seat back.

BRIEF SUMMARY OF THE INVENTION

Accordingly, it is an objective of the present invention to provide a side impact airbag apparatus that achieves a good balance between the deploying performance and the storage performance of the airbag.

To achieve the foregoing objective and in accordance with a first aspect of the present invention, a side impact airbag apparatus for a vehicle having seats for seating occupants thereon is provided. The side impact apparatus includes an inflator, an airbag, and a storage portion. The inflator discharges inflation gas in response to an impact applied to the vehicle. The airbag incorporates the inflator in a rear portion, and is folded to form a storage state. The storage portion is located in the vicinity of an outer side of an occupant when seated on a vehicle seat, in which the storage portion stores the inflator and the airbag when the airbag is in the storage state. The side impact airbag apparatus uses the inflation gas discharged from the inflator to inflate and deploy the airbag into a space between a body side portion of the vehicle and the vehicle seat while unfolding the airbag. The airbag in the storage state is formed by bringing a front portion of the airbag in a deployed state that is forward of the inflator into a transitional form elongated substantially in an up-down direction by folding the airbag from front toward rear, and folding in a bellows-like manner a lower portion of the airbag in the transitional form that is below the inflator from bottom toward top such that folded sections are substantially perpendicular to the up-down direction.

In accordance with a second aspect of the present invention, another side impact airbag apparatus for a vehicle having seats for seating occupants thereon is provided. The side impact apparatus includes an inflator, an airbag and a storage portion. The inflator discharges inflation gas in response to an impact applied to the vehicle. The airbag incorporates the inflator in a rear portion, and is folded to form a storage state. The storage portion is located in the vicinity of an outer side of an occupant when seated on a vehicle seat, in which the storage portion stores the inflator and the airbag when the airbag is in the storage state. The side impact airbag apparatus uses the inflation gas discharged from the inflator to inflate and deploy the airbag into a space between a body side portion of the vehicle and the vehicle seat while unfolding the airbag. The airbag in the storage state includes a first folding portion and a second folding portion. The first folding portion is formed only by folding from the front toward the rear a front portion of the airbag in the deployed state that is located forward of the inflator. The second folding portion is formed by folding a portion of the first folding portion that is below the inflator from the bottom toward the top in a bellows like manner.

Other aspects and advantages of the invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE INVENTION

One embodiment of the present invention will now be described with reference to the drawings.

In the following, the direction in which a vehicle advances forward be referred to as the front (front of the vehicle), the and reverse direction will be referred to as the rear (rear of the vehicle). In the following, the left and right direction refers to the widthwise direction of the vehicle, that is, the left and right direction when facing in the direction of the vehicle when advancing forward.

Figure 1:
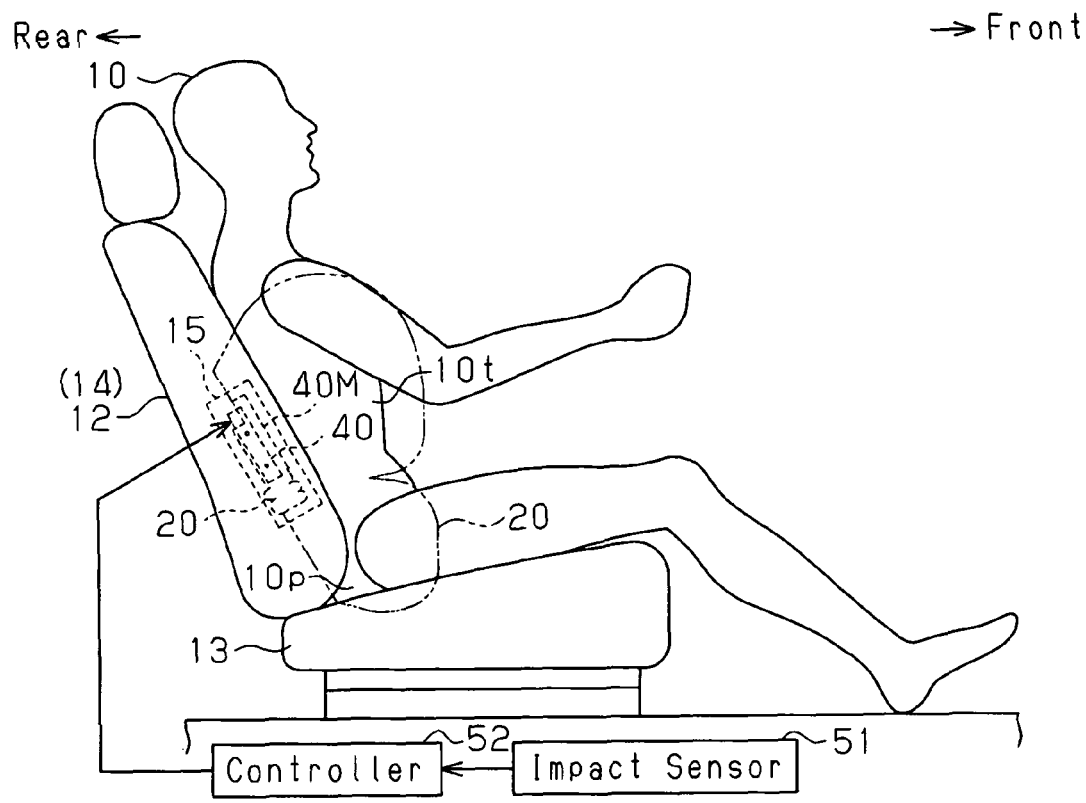
FIG. 1 is a side view illustrating a vehicle seat to which a side impact airbag apparatus according to one embodiment of the present embodiment is mounted.
Figure 2:
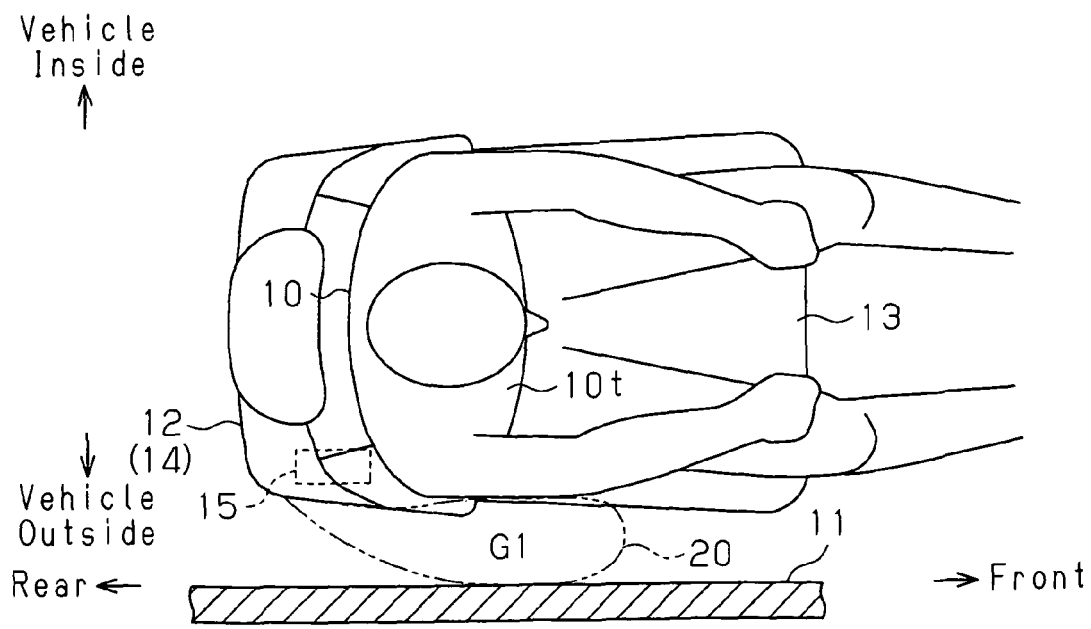
FIG. 2 is a partially cross-sectional plan view illustrating the positional relationship between a vehicle seat and a body side portion.

As shown in FIGS. 1 and 2, a vehicle seat 12 is arranged on the inner side (upper side as viewed in FIG. 2) of a body side portion 11 of the vehicle. The body side portion 11 refers to a member that is located at a side of the vehicle. Part of the body side portion 11 corresponding to the front seat includes a front door and a center pillar (B-pillar). Part of the body side portion 11 corresponding to the rear seat includes a rear part of the side door (rear door), a C-pillar, a front part of the wheel well, and a rear quarter.

The vehicle seat 12 includes a seat cushion (seat portion) 13 and a seat back (backrest portion) 14. The seat back 14 extends upward from the rear end of the seat cushion 13 and includes a tilt adjusting mechanism (not shown). A storage portion 15 is provided in a side of the seat back 14 that is located closer to the vehicle exterior. The storage portion 15 is located in the vicinity of an outer side of an occupant 10 seated on the vehicle seat 12.

Figure 3:
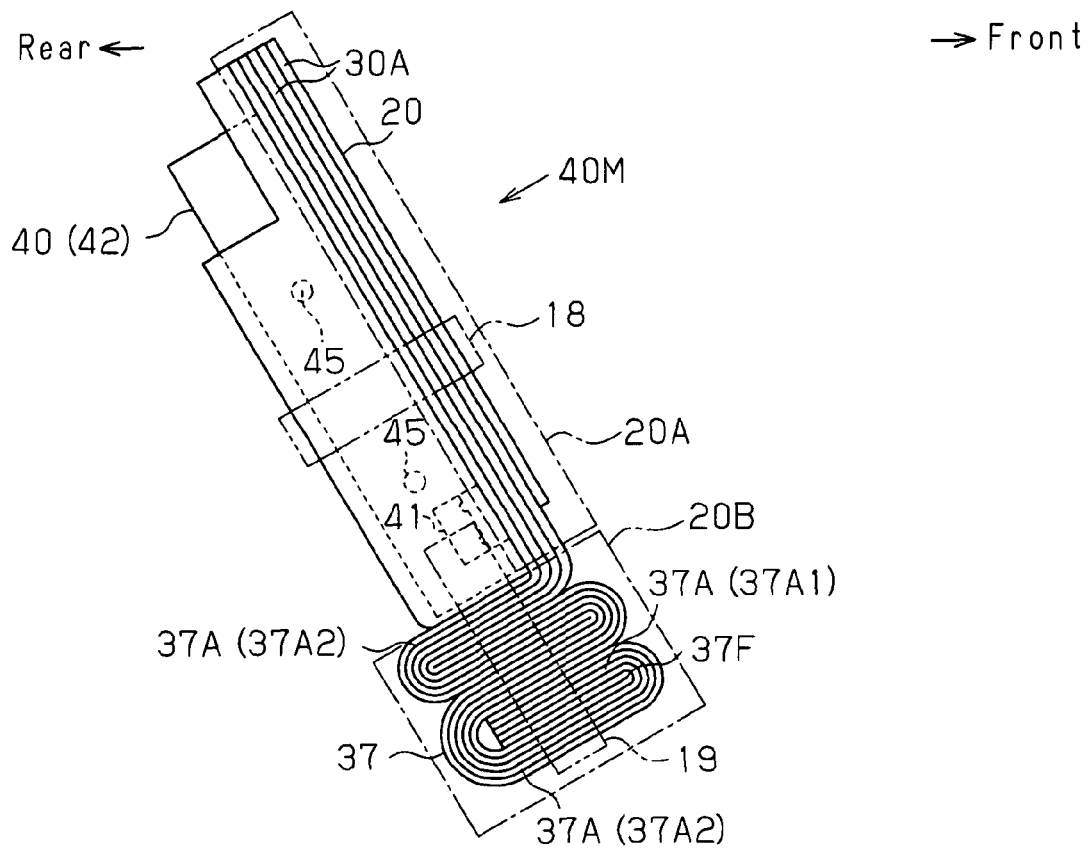
FIG. 3 is a side view illustrating an airbag module removed from a vehicle seat.
Figure 4:
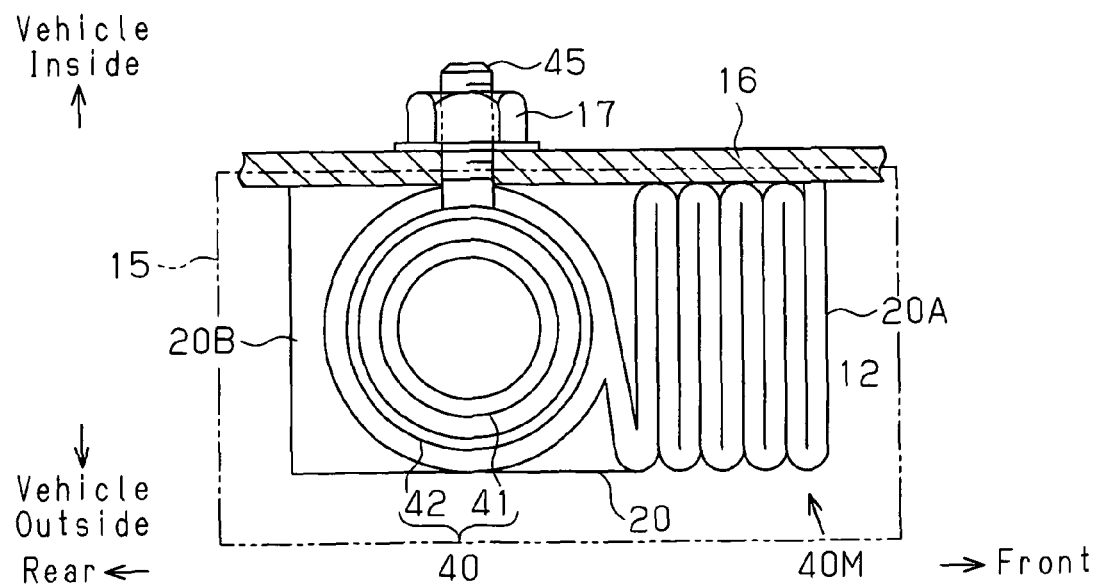
FIG. 4 is a partially cross-sectional view illustrating the airbag module as seen from diagonally above and from behind.

The storage portion 15 accommodates an airbag module 40M, which forms a main part of the side impact airbag apparatus. As shown in FIGS. 3 and 4, the airbag module 40M includes an airbag 20 and an inflator assembly 40 as major components.

Each of the components will now be described. In the present embodiment, the up-down direction and the front-rear direction of the components of the airbag module 40M are defined with reference to the seat back 14 of the vehicle seat 12. The up-down direction refers to the direction in which the seat back 14 extends upward, and the front-rear direction is perpendicular to the up-down direction. Since the seat back 14 is inclined in use such that the closer to the front end, the lower it becomes, the up-down direction is not strictly the vertical direction, but is slightly inclined. Likewise, the front-rear direction is not strictly a horizontal direction, but is slightly inclined.

<Airbag 20>

Figure 6:
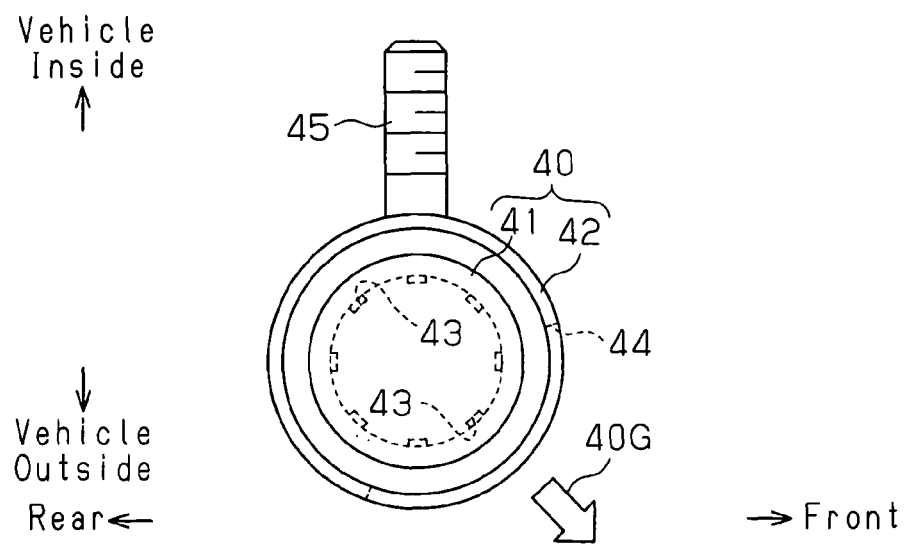
FIG. 6 is a plan view illustrating the inflator assembly as seen from diagonally above and from behind.
Figure 7:
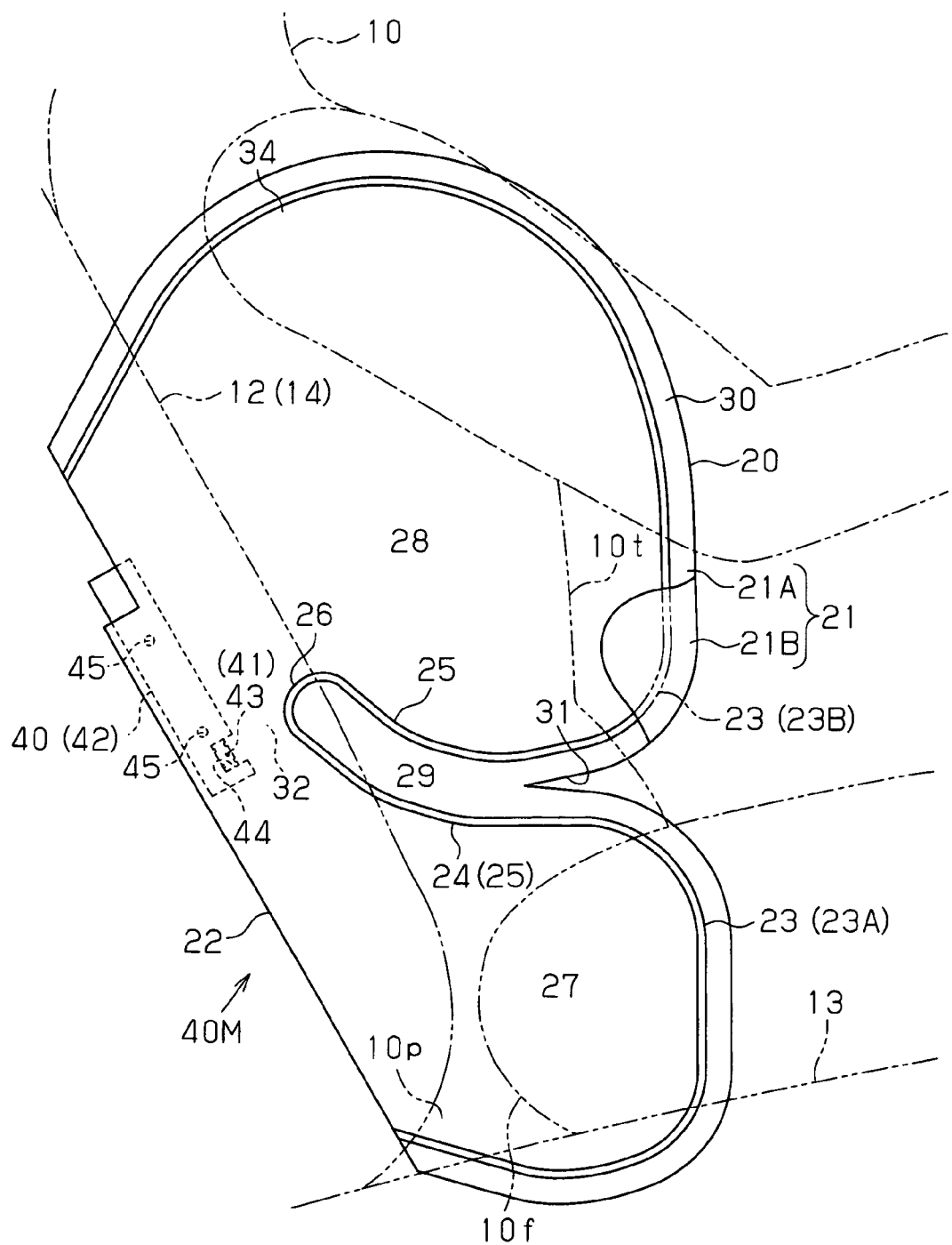
FIG. 7 is a side view illustrating the airbag in an inflated state, with an occupant.

FIG. 7 schematically shows the airbag module 40M in a state where inflation gas 40G (refer to FIGS. 5 and 6) fills the airbag 20 so that the airbag is inflated (inflated state). The airbag 20 is formed of a single base fabric sheet 21. The base fabric sheet 21 may be formed of a material having high strength and flexibility so as to be easily folded. The material may be, for example, woven cloth formed of polyester threads or polyamide threads.

Figure 9A:
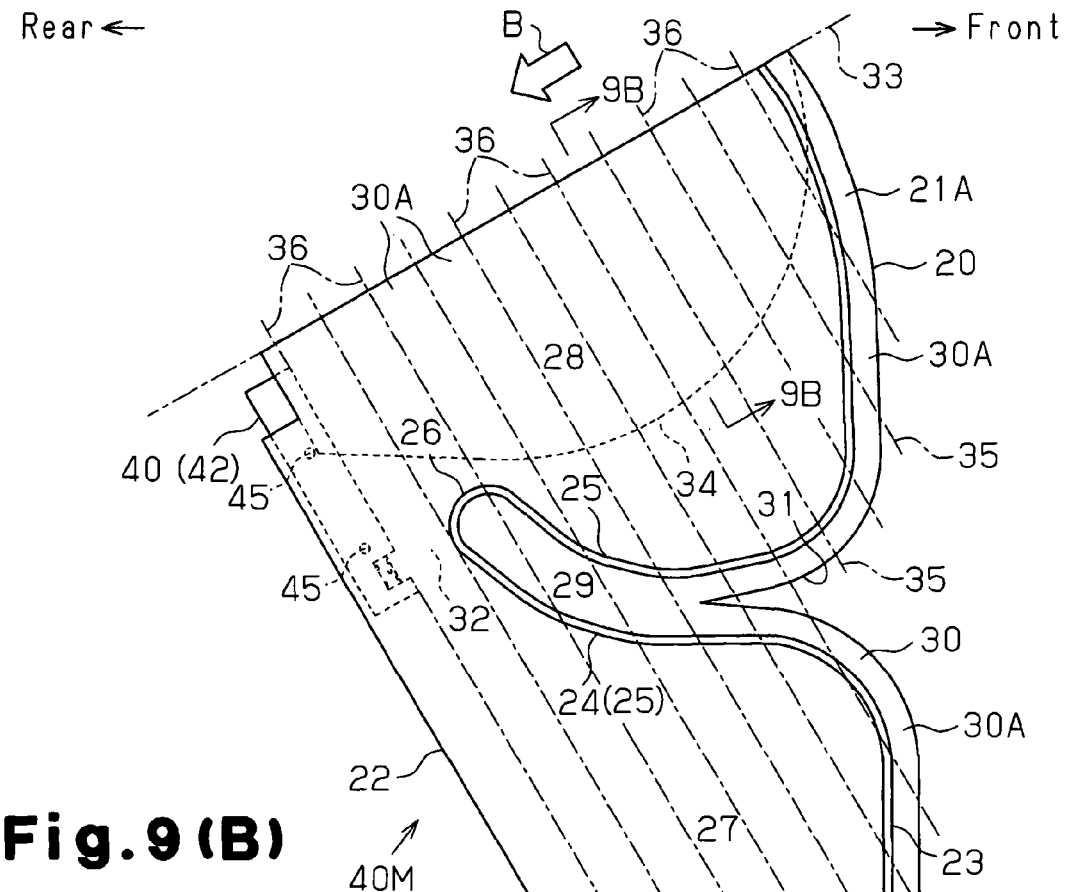
FIG. 9(A) is a side view illustrating the airbag module in an intermediate folding state (deployed state), in which the airbag in the flat deployment state is folded inward along a folding line.
Figure 9B:
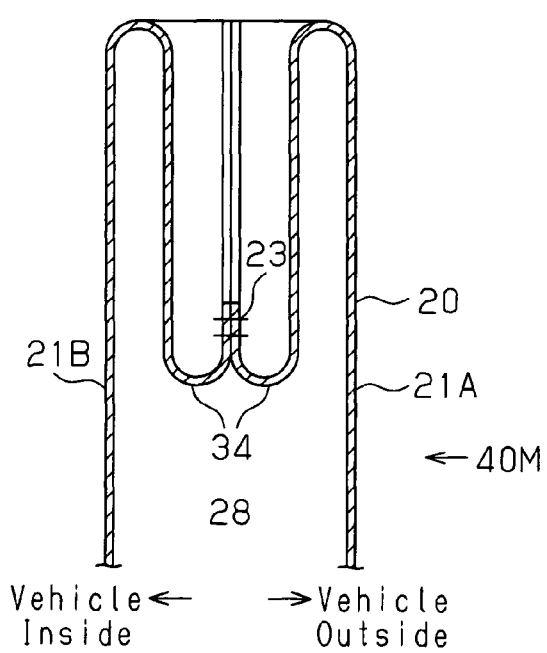
FIG. 9(B) is a partially cross-sectional view taken along line 9B-9B in FIG. 9(A), illustrating an upper portion of the airbag.

When forming the airbag 20, the base fabric sheet 21 having a predetermined shape is folded in half at the center, so that a pair of constituent sheets 21A, 21B having the same shape (refer to FIG. 9(B)) are obtained. FIG. 7 is a diagram in which a part of the outer side constituent sheet 21A is cut away, so that the inner side constituent sheet 21B is visible. The constituent sheets 21A, 21B are arranged such that a side 22 at which the base fabric sheet 21 is folded in half is located at the rear. The constituent sheets 21A, 21B have such size and shape that, when the airbag 20 is inflated and deployed, it occupies a large area spreading over the lumbar region 10P and the thorax 10*t* of the occupant 10 seated on the vehicle seat 12. The area that is between the occupant 10 and the body side portion 11 and occupied by the airbag 20 when the airbag 20 is inflated and deployed is referred to as a protection area 11A (refer to the largest area indicated by line with dashes that alternate between one long and two short dashes in FIG. 11).

The pair of constituent sheets 21A, 21B may be formed by overlapping two base fabric sheets. In this case, each base fabric sheet forms one of the constituent sheets 21A, 21B.

The constituent sheets 21A, 21B are joined to each other at a joint portion 23. In FIG. 7, a part in the joint portion 23 where the outer side constituent sheet 21A is not cut away is indicated by a thick broken line (refer to sign 23A). In the joint portion 23, a section where the outer side constituent sheet 21A is cut away and the inner side constituent sheet 21B is exposed is shown by the line with dashes that alternate between one long and two short dashes (refer to sign 23B).

Most of the joint portion 23 is formed by sewing the constituent sheets 21A, 21B at the peripheries with sewing threads. The remaining part forms a partition portion 24, which divides the interior of the airbag 20 into vertically divided chambers (in this embodiment, two chambers). The partition portion 24 is formed by a pair of extended portions 25 and a connection portion 26. The extended portions 25 extend from the front end of the constituent sheets 21A, 21B while being vertically spaced apart by a constant distance, and the connection portion 26 connects the rear ends of the extended portions 25. The connection portion 26 is slightly spaced forward from a rear peripheral portion (the side 22) of the constituent sheets 21A, 21B.

The chamber below the partition portion 24 constitutes a lumbar region protection portion 27, which is located on the outer side of the lumbar region 10P of the occupant 10 to protect the lumbar region 10P when the airbag 20 is inflated. The chamber above the partition portion 24 constitutes a thorax protection portion 28, which is located on the outer side of the thorax 10*t* of the occupant 10 to protect the thorax 10*t* when the airbag 20 is inflated.

A part of the constituent sheets 21A, 21B that is encompassed by the partition portion 24 constitutes a non-expansion portion 29, which is not inflated by the inflation gas 40G. The constituent sheets 21A, 21B has a slit 31 extending from the front end into the non-expansion portion 29. If an obstacle exists along the deployment direction of the airbag 20, the obstacle contacts the inner periphery of the slit 31, so that the lumbar region protection portion 27 is displaced downward and the thorax protection portion 28 is displaced upward. The displacement of the lumbar region protection portion 27 and the thorax protection portion 28 reduces the influence to the obstacle.

The joint portion 23 may be formed by method other than sewing using sewing thread as shown above, but may be formed by, for example, using an adhesive.

<Inflator Assembly 40>

Figure 5:
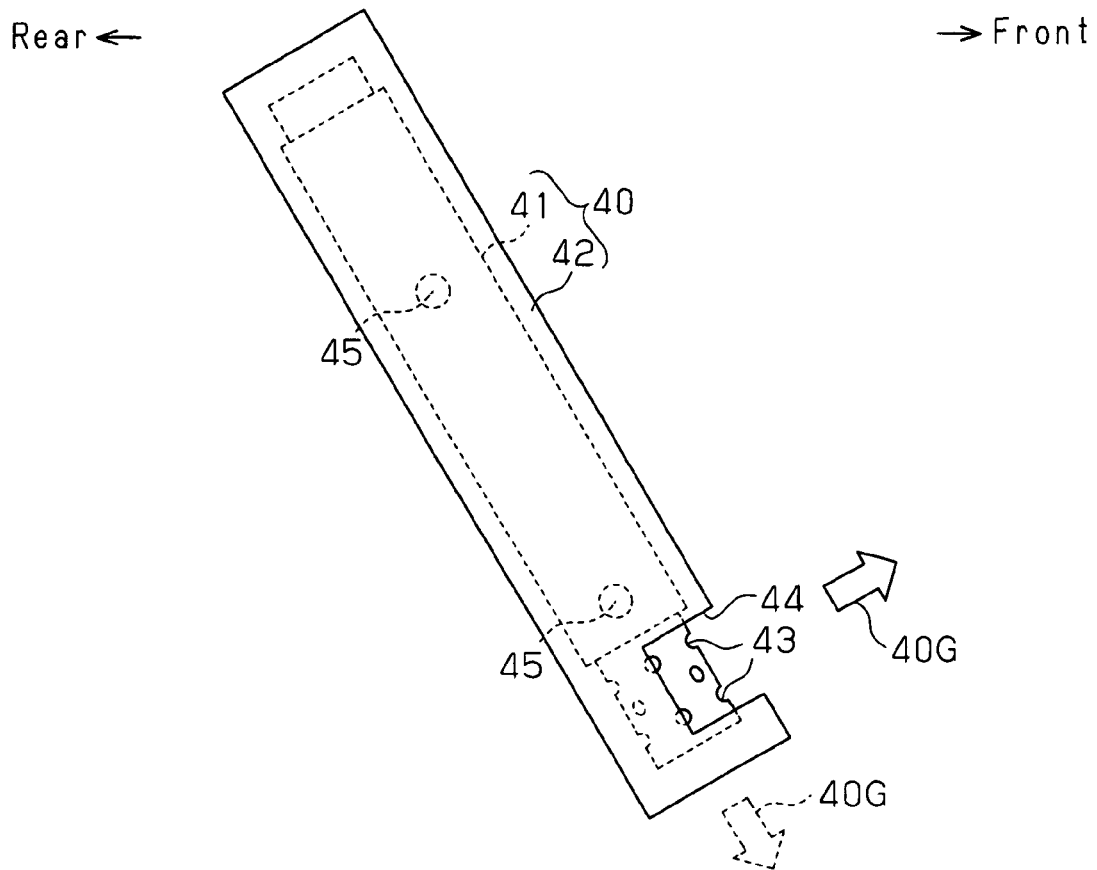
FIG. 5 is a side view illustrating an inflator assembly.

As shown in FIGS. 5 and 6, the inflator assembly 40 includes a gas source, which is an inflator 41, and a retainer 42 that surrounds the inflator 41. The inflator 41 is substantially formed like a thin cylinder extending substantially in the up-down direction, and accommodates a gas generating agent (not shown). The inflator 41 generates the inflation gas 40G by combustion reaction of the gas generating agent. A plurality of gas ports 43 are formed at the lower end of the inflator 41. The generated inflation gas 40G is ejected axially outward through the gas ports 43.

In place of the type using the gas generating agent as shown above, it is possible to use a type of inflator that breaks a partition wall of a high-pressure gas cylinder filled with a high-pressure gas by a low explosive so as to jet out the gas.

The retainer 42 functions as a diffuser and secures the inflator 41 to a seat frame 16 in the seat back 14 together with the airbag 20 (see FIG. 4). The retainer 42 is a plate made of, for example, metal, and is formed into a thin cylinder extending in the up-down direction through bending. The lower end of the retainer 42 is open. A window 44 is formed in a front side of the lower end of the retainer 42 to expose some of the gas ports 43 to the outside. Most of the inflation gas 40G discharged from the gas ports 43 is directed generally forward in the vehicle through the window 44 as indicated by the arrows outlined in FIGS. 5 and 6. Part of the inflation gas 40G is directed substantially downward from the opening at the lower end of the retainer 42 as indicated by the outlined arrow in broken line in FIG. 5.

The inflator assembly 40, which is configured as described above, is arranged in an upper portion of the interior of the airbag 20 and at a position slightly rearward of the partition portion 24. With the inflator assembly 40 incorporated in the rear upper portion of the airbag 20 as described above, the gas ports 43 of the inflator 41 and the window 44 of the retainer 42 are located in an upper portion of the lumbar region protection portion 27.

In the airbag 20, the connection portion 26 at the rear end of the partition portion 24 is slightly spaced forward from the retainer 42. This forms a communication portion 32 in a rear portion of the airbag 20 (between the connection portion 26 and the inflator assembly 40). The communication portion 32 allows the lumbar region protection portion 27 and the thorax protection portion 28 to communicate with each other. Therefore, some of the inflation gas 40G in the lumbar region protection portion 27 can flow into the thorax protection portion 28 through the communication portion 32.

Figure 8:
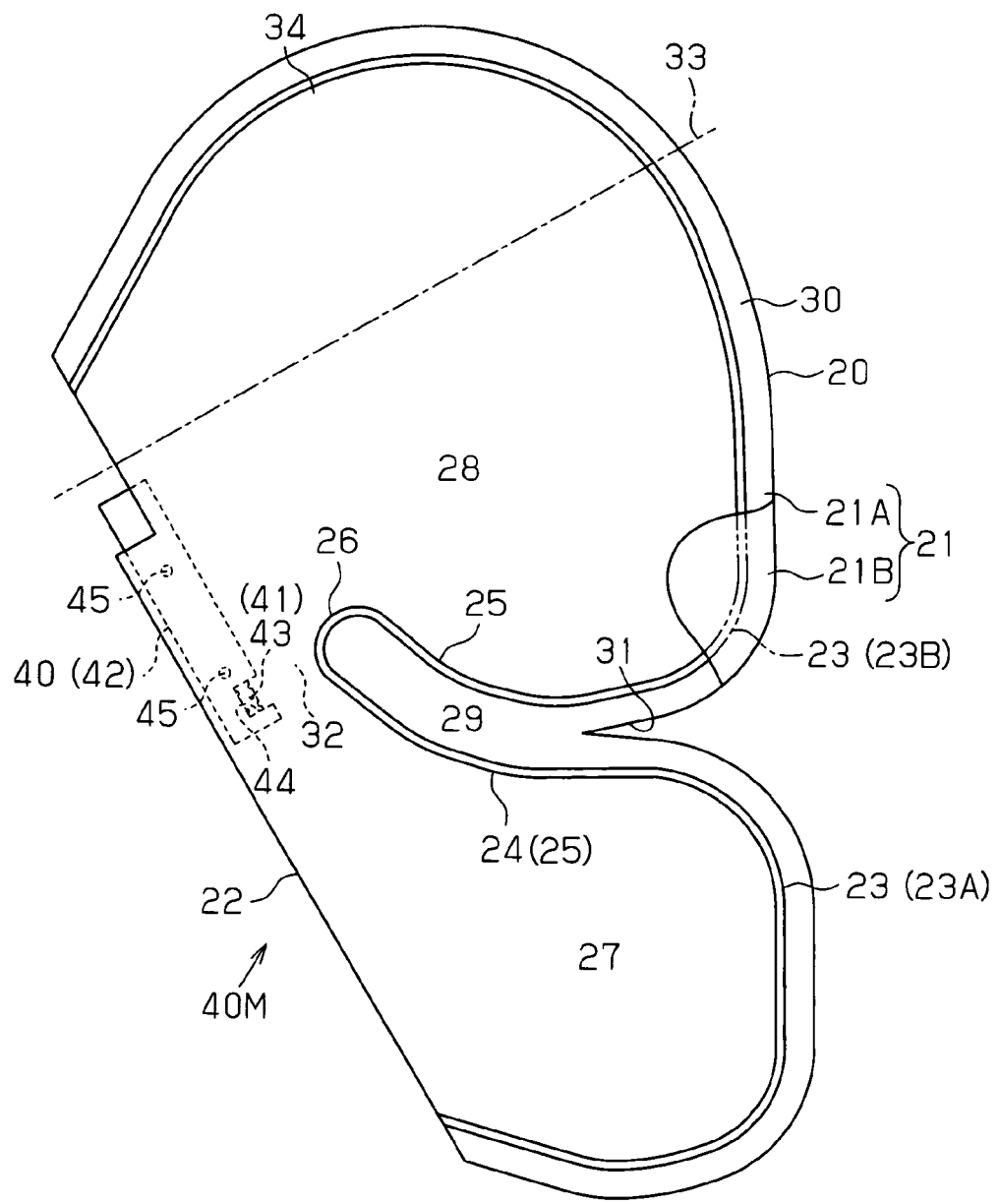
FIG. 8 is a side view illustrating the airbag flatly deployed without being filled with inflation gas (flat deployment state)

FIG. 8 schematically shows the airbag module 40M in a state where the airbag 20 is not filled with the inflation gas 40G and is flat (flat deployment state). By folding up the airbag 20 in the flat deployment state, the airbag module 40M is made into a compact form as shown in FIGS. 3 and 4 (storage state). The airbag module 40M is folded in this manner in order that it can be readily stored in a storage portion 15 having a limited size in the seat back 14.

Figure 11:
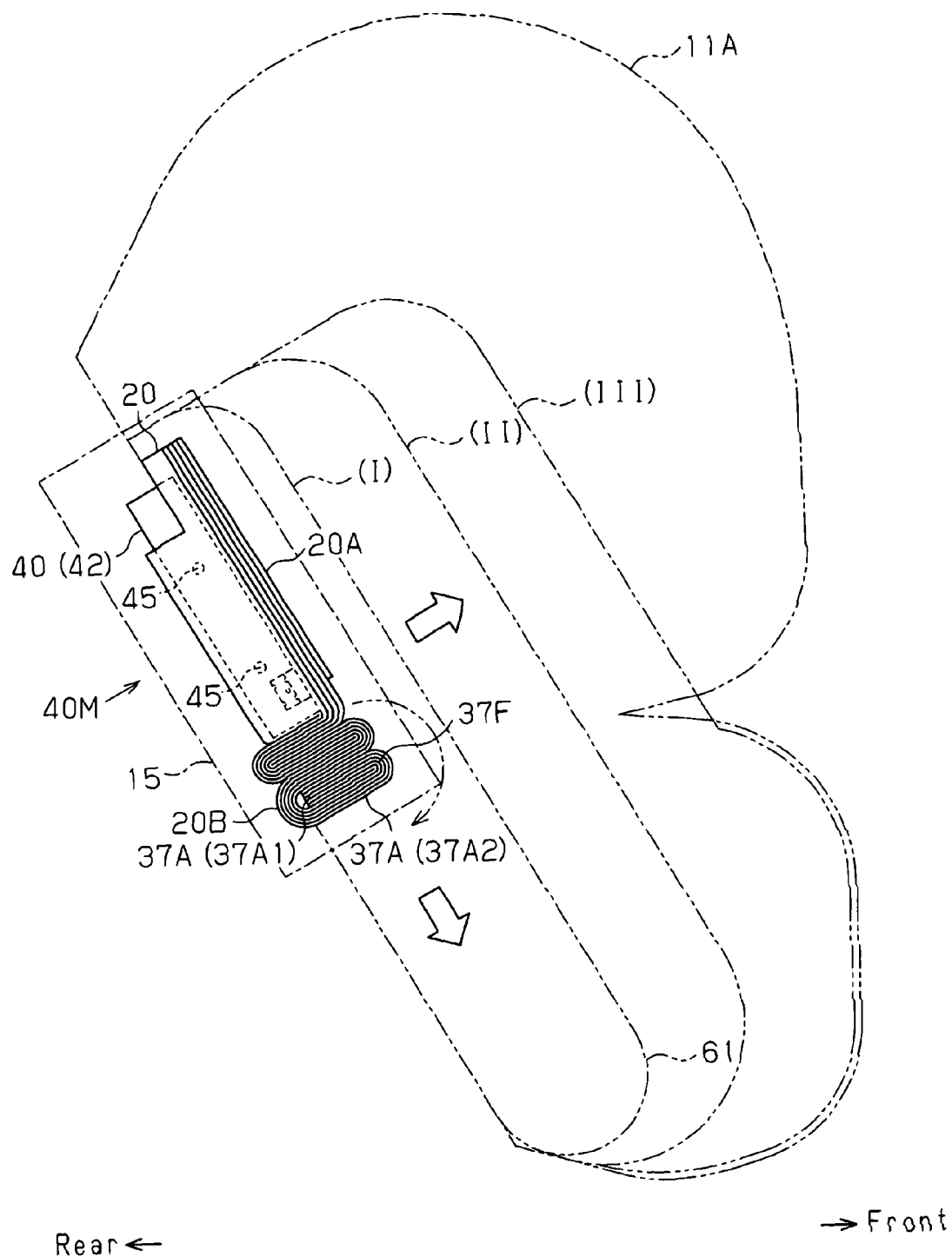
FIG. 11 is a diagram showing a process in which the airbag in the storage state is inflated and deployed, and showing a protection area.

The airbag 20 in the storage state has a first folding portion 20A and a second folding portion 20B shown in FIG. 11. The first folding portion 20A is formed only by folding from the front toward the rear a front portion 30, which is located forward of the inflator assembly 40 (see FIG. 9(A)) in the deployed airbag 20. The deployed state refers to the state shown in FIG. 9(*a*), which is an intermediate state when the airbag 20 is being folded. The second folding portion 20B is formed by folding a lower portion 37 of the first folding portion 20A that is below the inflator assembly 40 from the bottom toward the top in a bellows like manner. The first folding portion 20A and the second folding portion 20B are each held in a bound state using binding tapes 18 and 19 shown in FIG. 3. The binding tapes 18 and 19 are configured to be easily broken when the airbag 20 is inflated. In FIG. 4, the binding tapes 18 and 19 are not shown. These binding tapes 18 and 19 are not indispensable and may be omitted.

The airbag 20 in the flat deployment state is made into the storage state in the following manner. First as shown in FIG. 8, an upper portion of the thorax protection portion 28 of the airbag 20 in the flat deployment state is tacked in so that it is located inside of other portions of the airbag 20. Specifically, as shown by a dashed line in FIG. 8, one folding line 33, which extends substantially in the front-rear direction, is defined in an upper portion of the thorax protection portion 28. A portion 34 of the constituent sheets 21A, 21B of the airbag 20 above the folding line 33 is folded along the folding line 33 and tacked into the space between the constituent sheets 21A, 21B. Accordingly, as shown in FIGS. 9(A) and 9(B), the portion 34 enters the interior space between the constituent sheets 21A, 21B and is concealed. The dimension of the airbag 20 in the up-down direction is reduced by the amount corresponding to the tacked portion. The state of the airbag 20 at this stage is referred to as the intermediate folding state (deployed state) described above.

Next, the front portion 30 of the airbag 20 in the deployed state is folded at each predetermined width in a bellows-like manner. Specifically, as shown in FIG. 9(A), a plurality of folding lines (mountain fold lines 35 and valley fold lines 36), which extend linearly substantially in the up-down direction of the airbag 20, are defined. The mountain fold lines 43 and the valley fold lines 36 divide the front portion 30 into a plurality of folded sections 30A. The intervals between the mountain fold lines 35 and the valley fold lines 36 are equal to the folding width H when the airbag 20 is folded in a bellows-like manner.

Figures 10A, 10B:
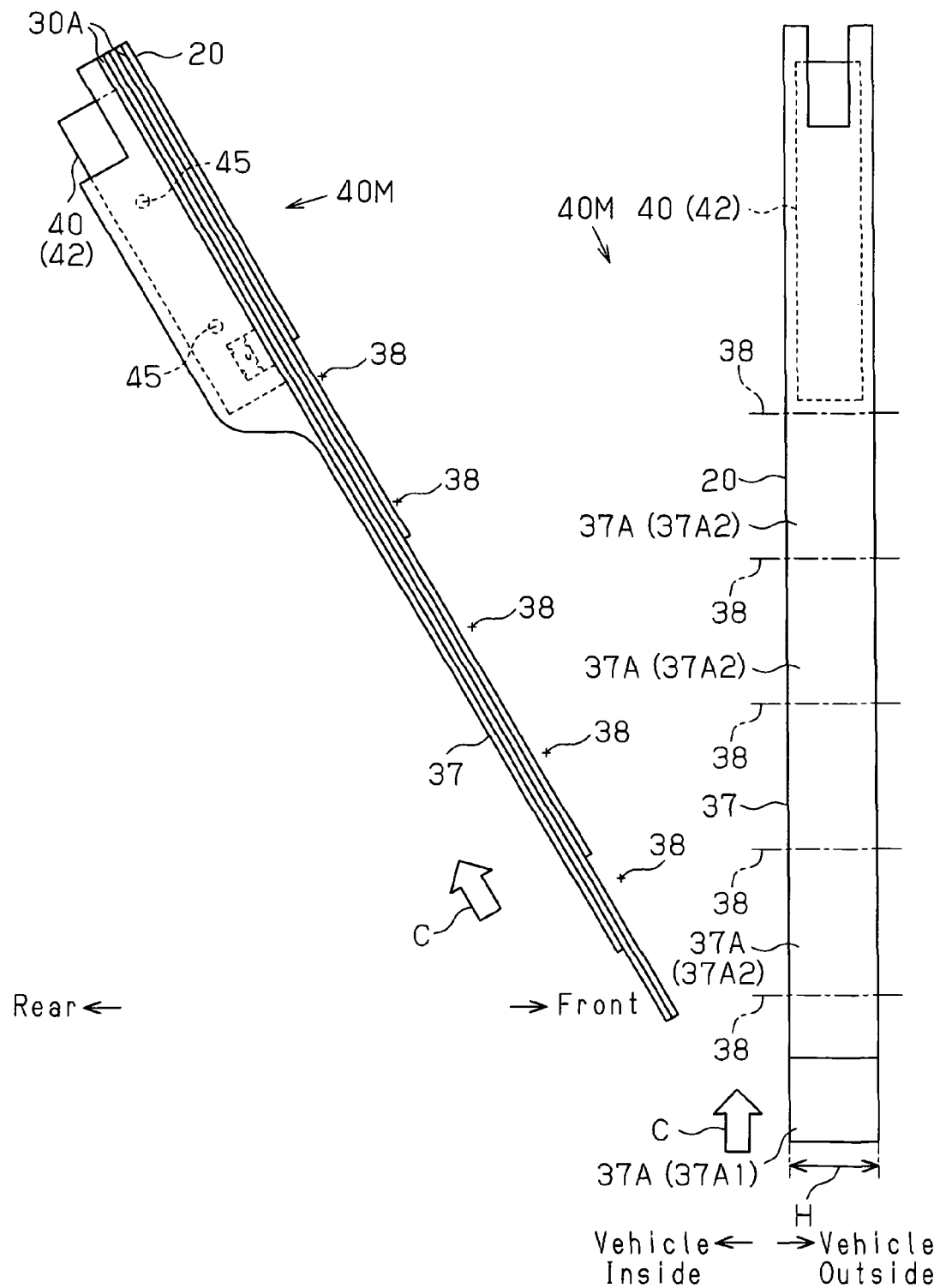
FIG. 10(A) is a side view illustrating the airbag module when the airbag is folded into a transitional form.
FIG. 10(B) is a rear view illustrating the airbag module of FIG. 10(A)

The airbag 20 is folded into a bellows-like state by being repeatedly folded, from the front toward the rear, along the mountain fold lines 43 and the valley fold lines 36 at each predetermined folding width H as shown by arrow B up to the vicinity of the inflator assembly 40. That is, the airbag 20 is folded in such manner that the surface of each folded section 30A between adjacent folding lines (a mountain fold line 35 and a valley fold line 36) is stacked to the surface of another folded section 30A. After the folding is completed, the surfaces of the folded sections 30A each extend perpendicularly to the front-rear direction as shown in FIG. 10(A). In other words, the folded sections 30A are laminated (bound) in the front-rear direction, so that the airbag 20 is in the transitional form with an elongated up-down dimension and a small front-rear dimension.

Subsequently, the lower portion 37 of the airbag 20 in the transitional form is folded. At this stage of folding, a plurality of straight folding lines 38, which extend substantially in the widthwise direction of the vehicle, are defined on the lower portion 37 of the airbag 20.

Prior to the defining of the folding lines 38, the front portion 30 is folded in a bellows-like manner from the front toward the rear, and the folded sections 30A are substantially perpendicular to the front-rear direction. Therefore, when bringing the airbag 20 into the transition form to the storage state, the folding lines 38 extending in the vehicle widthwise direction are defined in the lower portion 37 of the airbag 20 more easily than the case when lines extending in another direction are defined.

Accordingly, the lower portion 37 is divided into a plurality of rectangular folded sections 37A. The distance between adjacent folding lines 38 corresponds to the folding width when the lower portion 37 is folded. The airbag 20 is folded at each folding width from the bottom toward the top along the folding lines 38 in a bellows-like manner. In the present embodiment, the lowest one of the folded sections 37A (denoted by sign 37A1) is folded in a direction opposite to the folding direction of the other folded sections 37A (denoted by sign 37A2). As shown in FIG. 3, the folded sections 37A2 other than the lowest one are folded downward and stacked at each predetermined width while alternating the folding direction. In contrast, the lowest folded section 37A1 is folded upward at the front end 37F of the adjacent folded section 37A2.

At this stage, the folding of the lower portion 37 along the folding lines 38, which are defined in the folded sections 30A substantially perpendicular to the front-rear direction so as to extend in the widthwise direction of the vehicle, is performed more easily than folding along folding lines extending in a different direction.

The folded sections 37A as described above each extend substantially perpendicular to the up-down direction. In other words, all the folded sections 37A are laminated (bound) in the up-down direction.

As described above, the first folding portion 20A is formed by performing folding from the front toward the rear, whereas the second folding portion 20B is formed by performing folding from the bottom toward the top after performing folding from the front toward the rear. The formation of the folding portions 20A, 20B brings the airbag 20 into the storage state. The airbag module 40M having the airbag 20 is compact in the up-down direction as well as in the front-rear direction, and is suitably stored in the small storage portion 15.

In the first folding portion 20A, the folded sections 30A are bound with the binding tape 18. In the second folding portion 20B, the folded sections 37A (37A1, 37A2) are bound with the binding tape 19.

The retainer 42 of the airbag module 40M has an implanted bolt 45. The bolt 45 is passed through the seat frame 16 in the seat back 14. A nut 17 is screwed onto the bolt 45, so that the airbag module 40M in the storage state is fastened to the seat frame 16.

As shown in FIG. 1, the side impact airbag apparatus includes an impact sensor 51 and a controller 52 in addition to the above described airbag module 40M. The impact sensor 51 is configured by, for example, an acceleration sensor, and is provided in the body side portion 11 of the vehicle (see FIG. 2). The impact sensor 51 detects an impact applied to the body side portion 11 from the exterior. The controller 52 controls the operation of the inflator 41 based on a detection signal from the impact sensor 51.

In the side impact airbag apparatus according to the present embodiment, when the impact sensor 51 detects that an impact of a magnitude greater than or equal to a predetermined value has been applied to the body side portion 11, the controller 52, based on the detection signal, sends a command signal to the inflator 41 to activate the inflator 41. In response to the command signal, the gas generating agent in the inflator 41 generates high temperature and pressure inflation gas 40G, which is jetted out from the gas ports 43. Most of the inflation gas 40G is conducted substantially forward through the window 44 of the retainer 42 and into the lumbar region protection portion 27. Some of the inflation gas 40G is conducted substantially downward through the opening at the lower end of the retainer 42 and into the lumbar region protection portion 27 (refer to FIGS. 5 and 6).

The supplied inflation gas 40G inflates the lumbar region protection portion 27 and the thorax protection portion 28, which are in turn unfolded in reverse order to the order when folded. This is because parts that have been folded in later stages restrict parts that have been folded in earlier stages from being unfolded. In the present embodiment, the folding from the bottom toward the top is performed after the folding from the front toward the rear. Therefore, the lower portion 37 (the second folding portion 20B) of the airbag 20 in the storage state is deployed while being unfolded from the top toward the bottom (FIGS. 3 and 4). Normally, no object that significantly hinders the downward deployment of the airbag 20 is placed below the storage portion 15 (see FIGS. 2 and 7). Therefore, the lower portion 37 (the second folding portion 20B) of the airbag 20 is easily deployed to a position lower than the storage portion 15. The deployment causes the airbag 20 to have an elongated shape substantially in the up-down direction as indicated by state (I) in FIG. 11.

At this time, the folded sections 37A (37A1, 37A2) in the lower portion 37 (the second folding portion 20B) are substantially perpendicular to the up-down direction. Therefore, when receiving the pressure of the inflation gas 40G in the folded sections 37A, the lower portion 37 is deployed straight downward while being unfolded. Since the downward deployment occurs in a straight manner, the airbag 20 is easily deployed to a lower position below the storage portion 15.

As described above, the lowest folded section 37A1 is folded upward at the front end 37F of the adjacent folded section 37A2. Thus, when the lower portion 37 is deployed, the folded section 37A1 is pivoted rearward and downward about the front end 37F of the folded section 37A2 (as indicated by the arrow formed of a line having dashes that alternate between long and two short dashes in FIG. 11). Therefore, if an obstacle such as a piece of baggage is placed on the vehicle seat 12, the pivoting motion of the folded section 37A2 is directed away from the obstacle. Accordingly, compared to a case where the folded section 37A2 is pivoted forward and downward when the lower portion 37 is deployed, the folded section 37A1 is less likely to contact and strongly push the obstacle when being unfolded.

Subsequently, the airbag 20, which now has an elongated shape in the up-down direction due to the above described deployment, is deployed from the rear toward the front while being unfolded as indicated by states (II) and (III) of FIG. 11. At this time, the lower portion 61 of the airbag 20 in the state (I) is deployed forward while passing through a narrow space 40G1 (see FIG. 2) between the body side portion 11 of the vehicle and the lumbar region 10P and the thigh 10f of the occupant 10. The space 40G1 is generally narrower than the space between the body side portion 11 and other parts of the body of the occupant 10.

In the prior art, when the airbag 20 is about to enter the narrow space 40G1, the airbag 20 presses the occupant 10 against the seat cushion 13. In contrast, in the present embodiment, the lower portion 61 of the airbag 20 is first deployed to a low position, and is then deployed forward. The lower portion 61 thus does not press the occupant 10 against the vehicle seat 12. Therefore, compared to the prior art, in which the airbag is first deployed from the rear toward the front and is then deployed from the top toward the bottom, the airbag 20 according to the present embodiment easily pushes the occupant 10 inward in the widthwise direction of the vehicle. As a result, the airbag 20 is reliably deployed through the narrow space 40G1 between the occupant 10 and the body side portion 11, while pushing the lumbar region 10P and the thigh of the occupant 10 inward in the widthwise direction of the vehicle and widening the space 40G1.

At this time, the folded sections 30A in the front portion 30 of the airbag 20 in the storage state are all substantially perpendicular to the front-rear direction. Therefore, after the lower portion 37 is deployed downward, the front portion 30 receives the pressure of the inflation gas 40G at the folded sections 30A, and is deployed straight downward while being unfolded. Since the forward deployment occurs in a straight manner, the airbag 20 is easily deployed to a forward position.

When the airbag 20 has been deployed forward to some extent, the portion 34, which has been tacked into the space between the constituent sheets 21A, 21B, is unfolded.

Since the portion 34 is folded to be tacked in the space between the constituent sheets 21A, 21B, it is more easily unfolded compared to a case where it is folded in a different manner. For example, if an end portion of the airbag 20 is folded onto an outer side of the main portion, the end portion is inflated and unfolded after the inflation gas 40G reaches the end portion after passing through the main portion. In contrast, since the end portion is tacked inside, or located inside the main portion, the inflation gas 40G acts on the end portion in an early stage and pushes the end portion out of the main portion. The end portion is therefore quickly unfolded. Accordingly, although not illustrated, the portion 34 of the airbag 20 is quickly deployed upward.

In this manner, the airbag 20 is deployed to spread over the entire protection area 11A (refer to FIG. 11) on the outer side of the occupant 10, thereby reliably protecting the occupant 10 from the impact due to a side collision.

In the human body, the lumbar region 10P has a better impact resistance than the thorax 10t. Thus, it is preferable that the impact applied to the thorax 10t be made less than the impact applied to the lumbar region 10P by means of inflation and deployment of the airbag 20. In the present embodiment, when each portion of the airbag 20 is deployed, the inflation gas 40G ejected by the gas ports 43 is directly supplied to the lumbar region protection portion 27, while the thorax protection portion 28 is supplied with inflation gas 40G that has been supplied to the lumbar region protection portion 27 through the communication portion 32. As a result, the thorax protection portion 28 is inflated at a lower internal pressure than that of the lumbar region protection portion 27, and the inflation and deployment of the airbag 20 makes the impact applied to the thorax 10t of the occupant 10 smaller than that applied to the lumbar region 10P.

The present embodiment described above has the following advantages.

(1) When the airbag 20 is made into the storage state, the front portion 30 of the airbag 20 in the deployed state shown in FIG. 9(A), which is forward of the inflator assembly 40, is folded from the front toward the rear. This brings the airbag 20 into the transitional form, which is thin and elongated substantially in the up-down direction as shown in FIGS. 10(A) and 10(B). The lower portion 37, which is located below the inflator assembly 40 in the airbag 20 in the transitional form, is folded in a bellows-like manner from the bottom toward the top, such that the folded sections 37A1, 37A2 become substantially perpendicular to the up-down direction.

The airbag 20 therefore can be made into the compact storage state suitable for being stored in the narrow storage portion 15.

At a side collision of the vehicle, the lower portion 37 of the airbag 20 in the storage state is deployed to a lower position below the storage portion 15. Thereafter, the entire airbag 20 is deployed forward. The airbag 20 is therefore deployed over the wide protection area 11A on the outer side of the occupant 10, thereby protecting the occupant 10 from the impact due to the side collision.

(2) When the airbag 20 is made into the transitional form, the front portion 30 of the airbag 20 in the deployed state is folded in a bellows-like manner from the front toward the rear such that the folded sections 30A are substantially perpendicular to the front-rear direction as shown in FIG. 9(A). Thus, after the lower portion 37 is deployed downward, the airbag 20, which has a thin shape along the up-down direction, is deployed forward in a straight manner while being unfolded. Since the forward deployment occurs in a straight manner, the airbag 20 is reliably deployed to a forward position.

(3) The lower portion 37 of the airbag 20 in the transitional form is folded in a bellows-like manner from the bottom toward the top along the folding lines 38 extending in the widthwise direction of the vehicle as shown in FIG. 10(B). Therefore, when bringing the airbag 20 from the transition form into the storage state, the folding lines 38 extending in the vehicle widthwise direction are defined in the lower portion 37 of the airbag 20 more easily than the case when lines extending in a different direction are defined. The lower portion 37 of the airbag 20 is easily folded in a bellows-like manner from the bottom toward the top along the folding lines 38. In this manner, it is possible to achieve a good balance between the deployment performance and the folding performance.

(4) The space 40G1 between the lumbar region 10P of the occupant 10 and the body side portion 11 is in general narrower than the space between other parts of the body of the occupant 10 and the body side portion 11. Thus, when an airbag having a lumbar region protection portion is used, it is generally difficult to deploy the lumbar region protection portion between the lumbar region 10P and the body side portion 11. According to the present embodiment, the folding portions 20A, 20B are provided to the side impact airbag apparatus, which has the airbag 20 with the lumbar region protection portion 27. Therefore, the lumbar region protection portion 27, which has been deployed to a lower position below the storage portion 15, is deployed into the narrow space 40G1 between the lumbar region 10P of the occupant 10 and the body side portion 11. The lumbar region 10P is thus effectively protected.

(5) Generally, in a case where the interior of an airbag is vertically divided into a plurality of chambers by partitions, a chamber in a lower portion is pulled toward the adjacent chamber above. Therefore, to reliably protect the lumbar region 10P of the occupant 10 using an airbag, it is important to deploy the lowest chamber forward at a lower position.

In the side impact airbag apparatus according to the present embodiment, the interior of the airbag 20 is vertically divided into two chambers, so that the thorax protection portion 28 and the lumbar region protection portion 27. Such an airbag apparatus is particularly advantageous when the lumbar region protection portion 27 is deployed to a lower position below the storage portion, and then the airbag 20 is deployed forward. That is, by deploying the lower portion of the lumbar region protection portion 27 in the narrow space 40G1 between the lumbar region 10P and the body side portion 11, the occupant, particularly the lumbar region 10P, is reliably protected even if the lumbar region protection portion 27 is pulled upward by the adjacent thorax protection portion 28 above.

(6) When the lower portion 37 of the airbag 20 in the transitional form is folded, the folded section 37A1 at the lowest position is folded upward at the front end 37F of the adjacent folded section 37A2 and onto the upper side of the folded section 37A2. Thus, when the lower portion 37 is deployed, the folded section 37A1 is pivoted rearward and downward about the front end 37F of the folded section 37A2. Therefore, if an obstacle such as a piece of baggage is placed on the vehicle seat 12, the pivoting motion of the folded section 37A2 is directed away from the obstacle. Accordingly, compared to a case where the folded section 37A2 is pivoted forward and downward when the lower portion 37 is deployed, the folded section 37A1 is less likely to contact and strongly push the obstacle on the vehicle seat 12 when being unfolded.

The present invention may be modified as follows.

When folding the lower portion 37, the folded section 37A1 at the lowest position may be folded at the rear end of the adjacent folded section 37A2 and onto the lower side of the folded section 37A2. In this case, the advantages of the items (1) to (5) are also obtained.

The state in which the airbag 20 is deployed flatly, that is, the flat deployment state shown in FIG. 8, may be defined as "deployed state" in the claims. In other words, a portion of the airbag 20 in the flat deployment state that is forward of the inflator assembly 40 may be defined as a transitional form that extends thinly in substantially an up-down direction may be obtained.

The front portion 30 of the airbag 20 in the deployed state may be folded from the front toward the rear in a folding method different from folding in a bellows-like manner.

Instead of the seat back 14, the storage portion 15 may be located in the body side portion 11 at a position that is close to the outer side of the occupant 10 seated on the vehicle seat 12.

The inflator 41 and the retainer 42 of the inflator assembly 40 may be integrated.

The interior of the airbag 20 may be vertically divided into three or more chambers by partitions 24. In this case, the lowest chamber may be used to protect the lumbar region 10P of the occupant 10 (lumbar region protection portion), and each of the above chambers may be used to protect at least one of the thorax 10t, the abdomen, the shoulder, and the head of the occupant 10. Each chamber may be used to protect a part of the occupant's body other than the lumbar region 10P.

The present invention may be applied to a side impact airbag apparatus that has an airbag 20 without a lumbar region protection portion 27. In this case, a portion of the airbag in the transitional form above the inflator is folded in a bellows-like manner from the top toward the bottom such that folded sections are perpendicular to the up-down direction. Accordingly, the airbag is made into a storage state. This configuration also achieves a good balance between deployment performance and the storage performance of the airbag. Such a side impact airbag apparatus that has an airbag 20 without a lumbar region protection portion 27 includes, for example, a side impact airbag apparatus that protects the head and thorax of an occupant when an impact due to a side collision is applied to the body side portion of a vehicle.

Therefore, the present examples and embodiments are to be considered as illustrative and not restrictive and the invention is not to be limited to the details given herein, but may be modified within the scope and equivalence of the appended claims.

The invention claimed is:

1. A side impact airbag apparatus for a vehicle having seats for seating occupants thereon, the side impact apparatus comprising:
   an inflator that discharges inflation gas in response to an impact applied to the vehicle;
   an airbag incorporating the inflator in a rear portion, the airbag being folded to form a storage state; and
   a storage portion located in the vicinity of an outer side of an occupant when seated on a vehicle seat, in which the storage portion stores the inflator and the airbag when the airbag is in the storage state,
   wherein the side impact airbag apparatus uses the inflation gas discharged from the inflator to inflate and deploy the airbag into a space between a body side portion of the vehicle and the vehicle seat while unfolding the airbag, and
   wherein the airbag in the storage state is formed by bringing a front portion of the airbag in a deployed state that is forward of the inflator into a transitional form elongated substantially in an up-down direction by folding the airbag from front toward rear, and folding in a bellows-like manner a lower portion of the airbag in the transitional form that is below the inflator from bottom toward top such that folded sections are substantially perpendicular to the up-down direction and are stacked in the storage state in the up-down direction.

2. The side impact airbag apparatus according to claim 1, wherein the airbag in the transitional form is formed by folding in a bellows-like manner the front portion of the airbag in the deployed state from the front to the rear such that folded sections are substantially perpendicular to the front-rear direction, and
   wherein the folding in a bellows-like manner of the lower portion of the airbag in the transitional form from the bottom toward the top is executed at a folding line defined in the lower portion to extend in a widthwise direction of the vehicle.

3. The side impact airbag apparatus according to claim 1, wherein the airbag has a lumbar region protection portion in the lower portion, the lumbar region protection portion being inflated and deployed on the outer side of the lumbar region of the occupant.

4. The side impact airbag apparatus according to claim 1, wherein the interior of the airbag is vertically divided into a plurality of chambers by at least one partition.

5. The side impact airbag apparatus according to claim 1, wherein, at the folding of the lower portion, the folded section at the lowest position is folded upward at the front end of the adjacent folded section to be stacked onto an upper side of the adjacent folded section.

6. The side impact airbag apparatus according to claim 1, wherein, in the deployed state, an upper portion of the airbag in a flat deployment state is folded to be tacked into the airbag along a folding line that extends substantially in the front-rear direction.

7. A side impact airbag apparatus for a vehicle having seats for seating occupants thereon, the side impact apparatus comprising:

an inflator that discharges inflation gas in response to an impact applied to the vehicle;

an airbag incorporating the inflator in a rear portion, the airbag being folded to form a storage state; and a storage portion located in the vicinity of an outer side of an occupant when seated on a vehicle seat, in which the storage portion stores the inflator and the airbag when the airbag is in the storage state, wherein the side impact airbag apparatus uses the inflation gas discharged from the inflator to inflate and deploy the airbag into a space between a body side portion of the vehicle and the vehicle seat while unfolding the airbag, and wherein the airbag in the storage state includes:

a first folding portion that is formed only by folding from the front toward the rear a front portion of the airbag in the deployed state that is located forward of the inflator; and a second folding portion that is formed by folding a portion of the first folding portion that is below the inflator from the bottom toward the top in a bellows-like manner, wherein the second folding portion includes folded sections that are stacked in the storage state in an up-down direction.

\* \* \* \* \*